United States Patent

Nakamura

Patent Number: 5,262,892
Date of Patent: Nov. 16, 1993

[54] OPTICAL ISOLATOR

[75] Inventor: Noriyuki Nakamura, Kanagawa, Japan

[73] Assignee: Kabushiki Kaisha Shinkosha, Tokyo, Japan

[21] Appl. No.: 871,454

[22] Filed: Apr. 21, 1992

[30] Foreign Application Priority Data

Jul. 25, 1991 [JP] Japan .................. 3-207169

[51] Int. Cl.$^5$ ............................... G02B 5/30
[52] U.S. Cl. ......................... 359/484; 359/495; 359/497; 359/282
[58] Field of Search ............ 359/484, 485, 494, 495, 359/497, 499, 281, 282; 372/703

[56] References Cited

U.S. PATENT DOCUMENTS

| | | | |
|---|---|---|---|
| 3,438,692 | 4/1969 | Tabor | 359/495 |
| 3,540,795 | 11/1970 | Harris | 359/495 |
| 4,178,073 | 12/1979 | Uchida et al. | 359/484 |
| 4,239,329 | 12/1980 | Matsumoto. | |
| 4,461,543 | 7/1984 | McMahon | 359/497 |
| 4,548,478 | 10/1985 | Shirasaki | 359/484 |
| 4,974,944 | 12/1990 | Chang | 359/497 |
| 4,988,170 | 1/1991 | Buhrer | 359/497 |
| 5,151,955 | 9/1992 | Ohta et al. | 359/282 |

FOREIGN PATENT DOCUMENTS

| | | | |
|---|---|---|---|
| 0130934 | 7/1985 | Japan | 359/484 |
| 1-287528 | 11/1989 | Japan | 359/484 |
| 2-46419 | 2/1990 | Japan | 359/484 |
| 0178611 | 7/1990 | Japan | 372/703 |
| 2-188715 | 7/1990 | Japan | 359/484 |

OTHER PUBLICATIONS

"Polarization Independent Isolator Using Spatial Walk-off Polarizers", Kok Wai Chang and Wayne V. Sorin, IEEE Photonics Technology Letters, vol. 1, No. 3, Mar., 1989.

Primary Examiner—Bruce Y. Arnold
Assistant Examiner—R. D. Shafer
Attorney, Agent, or Firm—Jordan and Hamburg

[57] ABSTRACT

In an optical isolator, first, second and third birefringent crystals shaped in a flat plate are arranged in order in a forward direction in which a light beam advances and formed in ratios 1:1:1 in thickness. One magneto-optical member is interposed between the first and second birefringent crystals and another magneto-optical member may be arbitrarily disposed between the second and third birefringent crystals. Since the birefringent crystals are equal in thickness, the optical isolator can be readily produced with a high accuracy without much labor.

3 Claims, 3 Drawing Sheets

OPTICAL ISOLATOR

BACKGROUND OF THE INVENTION

1. Field of the Invention

This invention relates to a polarization independent optical isolator.

2. Description of the Prior Art

A polarization independent optical isolator in, for example, Japanese Patent Application Public Disclosure No. SHO 54-14709, published Nov. 16, 1979. This conventional optical isolator comprises first, second and third birefringent crystals having flat plate shapes and first and second rotators providing 45° of Faraday rotation and interposed between the first and second birefringent crystals.

The first, second and third birefringent crystals of the aforenoted conventional optical isolator have thickness ratios of $\sqrt{2}:1:1$. That is to say, the processing for preparing the birefringent crystals of two sorts different in thickness (one relatively thick birefringent crystal and two relatively thin birefringent crystals) consumes labor and proves to be troublesome. Thus, the conventional optical isolator has suffered a disadvantage such that it is unsuitable for mass production.

SUMMARY OF THE INVENTION

An object of this invention is to provide an optical isolator capable of reducing the labor for processing birefringent crystals and being mass-produced.

To attain the object mentioned above according to this invention, there is provided an optical isolator comprising at least first, second and third birefringent crystals having flat plate shapes and at least one magneto-optical member. The first, second and third birefringent crystals are arranged between light waveguides in order in the direction of a light beam propagated therethrough. The ratios of the thicknesses of the first, second and third birefringent crystals are 1:1:1. The aforenoted magneto-optical member is interposed between two of the birefringent crystals so as to shift the direction of polarization of the light beam passing through the adjacent birefringent crystal by a magnetic field applied thereto.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The other objects and features of the present invention will be hereinafter explained in detail with reference to the accompanying drawings, wherein:

FIG. 2(I) is a schematic diagram showing the polarizations of ordinary and extraordinary light beams advancing in the forward direction in the optical isolator of FIG. 1, FIG. 2(II) is a schematic diagram showing the polarizations of ordinary and extraordinary light beams advancing in the reverse direction in the optical isolator of FIG. 1.

DESCRIPTION OF THE PREFERRED EMBODIMENTS

This invention will become more fully understood from the detailed description given hereinbelow and the accompanying drawings which are given by way of illustration only, and thus are not limitative of the present invention.

Figures 1, 2:
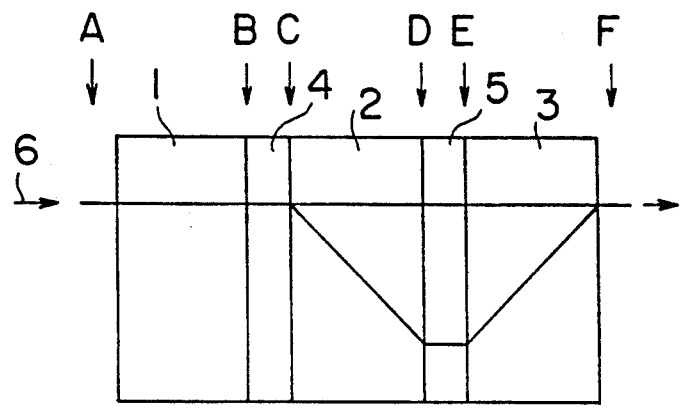
FIG. 1 is a diagram showing the structure of a first embodiment of the optical isolator according to the present invention.

One preferred embodiment of the optical isolator according to this invention is illustrated in FIG. 1. The illustrated optical isolator comprises, in combination, first, second and third birefringent crystals 1, 2 and 3 having flat plate shapes and first and second magneto-optical members 4 and 5.

These elements 1-5 constituting the optical isolator are interposed between two light waveguides (for example, optical fibers). The elements 1-5 are arranged in order in the forward direction of light beam propagated therethrough in such a state that the first birefringent crystal 1 is placed on the left end in FIG. 1, and the first magneto-optical member 4, the second birefringent crystal 2, the second magneto-optical member 5 and the third birefringent crystal 3 are arranged rightward in order.

All the birefringent crystals 1-3 are made of rutile. The ratios of the thicknesses of the birefringent crystals are 1:1:1.

The first birefringent crystal 1 has a plane of polarization (plane perpendicular to a penetrating end face and including an optical axis) and functions to divide a light beam incident thereupon into two polarized light components.

The plane of polarization of the second birefringent crystal 2 is inclined at 45° to the normal of the penetrating end face of the second birefringent crystal relative to the plane of polarization of the first birefringent crystal 1.

The plane of polarization of the third birefringent crystal 3 is inclined at 45° to the normal of the penetrating end face of the third birefringent crystal relative to the plane of polarization of the second birefringent crystal 2 and at 90° relative to the plane of polarization of the first birefringent crystal 1. The plane of polarization of the third birefringent crystal 3 functions to synthesize the two polarized light components passing through the second magneto-optical member 5.

The first and second magneto-optical members 4 and 5 are made of garnet. The first magneto-optical member 4 is adapted to shift the direction of polarization of the light beam passing through the first birefringent crystal 1 in response to the application of a magnetic field thereto. The second magneto-optical member 5 is adapted to shift the direction of polarization of the light beam passing through the second birefringent crystal 2 in response to the application of a magnetic field thereto. The thickness of the first magneto-optical member 4 is selected so that the directions of polarization of the two polarized light components emanating from the magneto-optical member are different by about 45° from those of the two polarized light components incident thereupon. The thickness of the second magneto-optical member 5 is selected similarly to that of the first magneto-optical member 4.

The operation of the optical isolator described above will be now described with reference to FIG. 2(I) and FIG. 2(II).

FIG. 2(I) shows a manner of ordinary and extraordinary polarized light components of the light beam 6 transmitted in the forward direction through the optical isolator at the respective points A-F in FIG. 1, as viewed from the light-emanating side (righthand in FIG. 1) of the isolator. FIG. 2(II) shows a manner of ordinary and extraordinary polarized light components transmitted in the reverse direction (direction in which the light beam is transmitted from right to left in FIG. 1) through the optical isolator at the respective points A-F in FIG. 1, as viewed from the light-incidence side (righthand in FIG. 1) upon which the light beam propagating backward is incident.

As illustrated in FIG. 1, the light beam 6 advancing in the forward direction enters into the first birefringent crystal 1 to be polarized and separated into ordinary and extraordinary polarized light components (points A-B). The polarized light components thus separated pass through the first magneto-optical member 4 to be subjected to 45° of polarization rotation (point C) in the clockwise direction (righthanded rotation) as viewed from the light-emanating side (right side in FIG. 1), and then, enter into the second birefringent crystal 2. Only the extraordinary component of the polarized light components entering into the second birefringent crystal 2 is displaced in parallel (point D). Then, both the polarized light components pass through the second magneto-optical member 5 to be subjected to 45° of polarization rotation (point E). That is, the ordinary polarized light component is subjected to 45° of polarization rotation (inclined at 90° relative to the light beam before entering into the first birefringent crystal 1). Thereafter, the separated ordinary and extraordinary polarized light components enter into the third birefringent crystal 3 and are there synthesized into one light beam. The synthesized light beam emanates from the third birefringent crystal 3 coaxially with the incident light beam 6 (point F).

The reverse-directed light beam propagating backward passes through the third birefringent crystal 3 to be polarized and separated into ordinary and extraordinary polarized light components (points F-E). The two polarized light components thus separated pass through the second magneto-optical member 5 while being subjected to 45° of polarization rotation (point D). Then, only the extraordinary polarized light component of the polarized light components passing through the second birefringent crystal 2 is displaced in parallel (point C). Next, both polarized light components pass through the first magneto-optical member 4 to be subjected to 45° of polarization rotation (points C, B). Though both of the polarized light components enter the first birefringent crystal 1, only the extraordinary component is displaced in parallel, consequently to largely deviate both the polarized light components from the optical axis along which the forward-directed light beam 6 enters into the first birefringent crystal 1, when emanating from the first birefringent crystal (point A).

Figure 3:
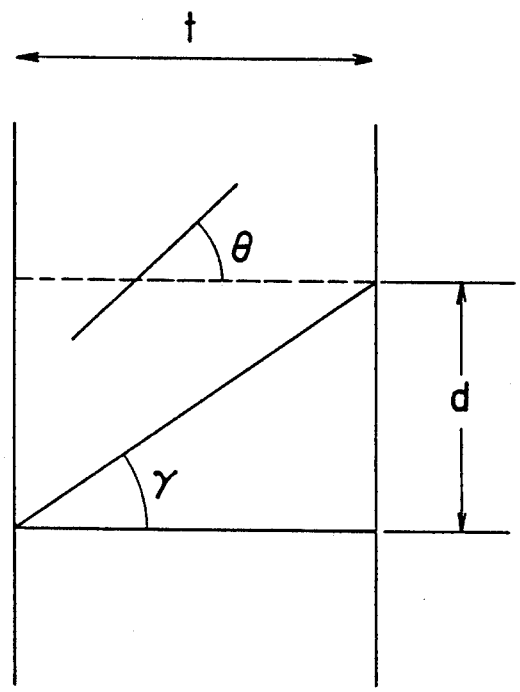
FIG. 3 is a graph showing the relations of the walk-off angle, walk-off separation and inclined angle in the birefringent crystal in the optical isolator.

The walk-off angle $\gamma$ and walk-off separation d of the birefringent crystal depend on the inclined angle $\theta$ (angle formed between the optical axis and the penetrating end face of the crystal) as shown in FIG. 3. Suppose the birefringent crystal has the thickness t, the refractive index n1 relative to an ordinary polarized light component, the refractive index n2 relative to an extraordinary polarized light component, the relation among the walk-off separation d, the thickness t of the crystal, the inclined angle $\theta$ and the walk-off angle $\gamma$ is expressed by the following Equations (1) and (2).

$$d = t \times \tan\gamma \tag{1}$$

$$\gamma = \theta - \tan^{-1}\{(n1/n2)^2 \tan\theta\} \tag{2}$$

Where the walk-off separations d of the ordinary and extraordinary polarized light components in the first, second and third birefringent crystals 1, 2 and 3 are in the ratios $1:\sqrt{2}:1$. Assuming that the refractive index n1 of the ordinary polarized light component is 2.453, the refractive index n2 of the extraordinary polarized light component n2 is 2.709, the inclined angle $\theta$ of the second birefringent crystal is 47.8°, and the thickness t of the crystal is 10 mm, the aforementioned Equations (1) and (2) give:

Walk-off angle $\theta = 5.678°$

Walk-off separation d = 0.994 mm

The walk-off separations brought about by the first and third birefringent crystals 1 and 3 are $1/\sqrt{2}$ of the second birefringent crystal 2, respectively.

Assuming that each thickness t of the first and third birefringent crystals 1 and 3 is 10 mm. and the walk-off separation d is $0.994/\sqrt{2}$ mm, the walk-off angle $\gamma$ becomes 4.02°, and the inclined angle $\theta$ becomes 24.6°.

Thus, by changing the inclined angle of the birefringent crystal, the walk-off separation can be arbitrarily determined, so that the respective thicknesses of the first, second and third birefringent crystals 1, 2 and 3 can be made equal. Therefore, the process for producing the birefringent crystals can be remarkably facilitated. The reason for this can be explained by the fact that the inclined angle can very easily be changed (when processing the birefringent crystals different in thickness).

The second preferred embodiment of this invention will be described with reference to FIG. 4.

An optical isolator of this embodiment comprises first, second and third birefringent crystals 11, 12 and 13 having flat plate shapes and a magneto-optical member 14 interposed between the first and second birefringent crystals. These elements 11-14 constituting the optical isolator are arranged between two light waveguides (for example, optical fibers). The ratios of the thicknesses of the birefringent crystals 11, 12, 13 are 1:1:1.

The birefringent crystals 11-13 are made of the same material as the birefringent crystals 1-3 in the former embodiment, and also, the magneto-optical member 14 is made of the same material as the magneto-optical members 4 and 5.

The birefringent crystal 11 is provided with a plane of polarization (perpendicular to the penetrating end face thereof and including the optical axis).

The first birefringent crystal 11 functions to divide of a light beam incident thereupon into two polarized light components. The plane of polarization of the second birefringent crystal 12 is inclined at 45° to the normal of the penetrating end face of the second birefringent crystal relative to the plane of polarization of the first birefringent crystal 11. The plane of polarization of the third birefringent crystal 13 is inclined at 45° to the normal of the penetrating end face of the third birefringent crystal relative to the plane of polarization of the second birefringent crystal 12. The plane of polarization of the third birefringent crystal 13 functions to synthesize the two polarized light components passing through the second birefringent crystal 12.

The magneto-optical member 14 is adapted to shift the direction of polarization of the light passing through the first birefringent crystal 11 in response to the application of a magnetic field thereto. The thickness of the magneto-optical member 14 is selected so that the directions of polarization of two polarized light components when emanating from the magneto-optical member are different by about 45° from those when entering into the magneto-optical member.

The operation of the optical isolator of this embodiment will be described with reference to FIG. 5(I) and FIG. 5(II).

Figure 4:
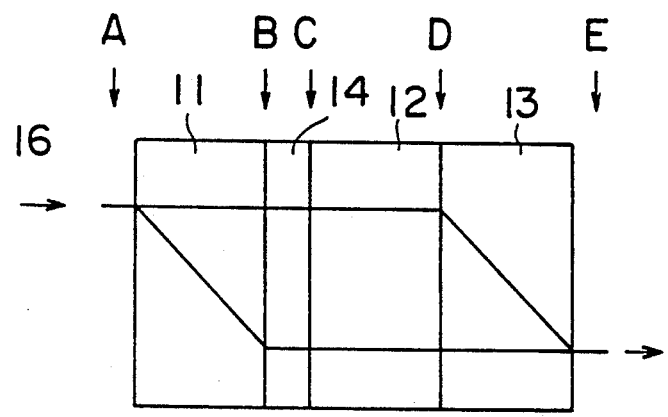
FIG. 4 is a diagram showing the structure of a second embodiment of the optical isolator according to the present invention.
Figure 5:
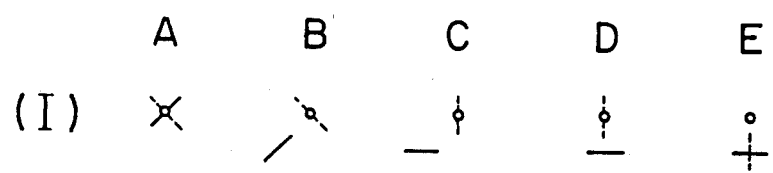
FIG. 5(I) is a schematic diagram showing the polarizations of ordinary and extraordinary light beams advancing in the forward direction in the optical isolator of FIG. 4, and FIG. 5(II) is a schematic diagram showing the polarizations of ordinary and extraordinary light beams advancing in the reverse direction in the optical isolator of FIG. 4.
Figure 5:
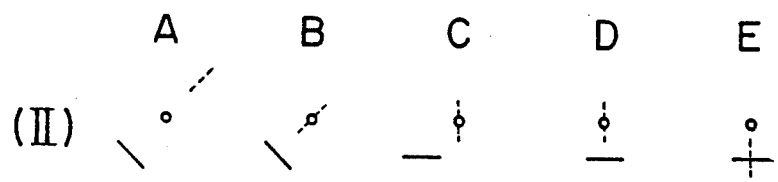

FIG. 5(I) shows a manner of ordinary and extraordinary light components of the light beam 16 advancing in the forward direction through the optical isolator at the respective points A-E in FIG. 4, as viewed from the light-emanating side (righthand in FIG. 4) of the isolator. FIG. 5(II) shows a manner of ordinary and extraordinary light components advancing in the reverse direction (direction in which the light beam is propagated from right to left in FIG. 4) at the respective points A-E in FIG. 4, as viewed from the light-incidence side (righthand in FIG. 4) upon which the light beam advancing backward is incident.

As shown in FIG. 4, the light beam 16 advancing in the forward direction enters into the first birefringent crystal 11 to be polarized and separated into ordinary and extraordinary polarized light components (points A-B). The polarized light components thus separated pass through the magneto-optical member 14 to be subjected to 45° of polarization rotation (point C) in the clockwise direction (righthanded rotation) as viewed from the light-emanating side and then enter into the second birefringent crystal 12. When the polarized light components enter into the second birefringent crystal 12, only the extraordinary component is displaced in parallel (point D). Then, the separated ordinary and extraordinary polarized light components enter the third birefringent crystal 13 to be synthesized into one light beam and emanate from the third birefringent crystal 13 (point E).

The reverse-directed light beam advancing backward passes through the third birefringent crystal 13 to be separated into ordinary and extraordinary polarized light components (points E-D). The two polarized light components thus separated pass through the second birefringent crystal 12 so that only the extraordinary component of the polarized light components is displaced in parallel. Next, both polarized light components pass through the magneto-optical member 14 to be subjected to 45° of polarization rotation (points C-B). Then, both the polarized light components enter the first birefringent crystal 11, and there, only the extraordinary component is displaced in parallel, consequently to largely deviate both the polarized light components from the optical axis along which the light beam 16 advances, when emanating from the first birefringent crystal 11 (point A).

The optical isolator of the second embodiment may be modified by reversing the direction in which the magnetic field is applied to the magneto-optical member.

In the foregoing embodiments, the constituent elements of the optical isolator (for instance, in the first embodiment, the first, second and third birefringent crystals 1, 2 and 3 and the first and second magneto-optical elements 4 and 5) are brought into intimate contact with one another, but this arrangement should not be understood as limitative.

In either embodiment, the first, second and third birefringent crystals are equal in thickness, and therefore, can be worked up without much labor in comparison with the conventional optical isolator of this type. Thus, the present invention provides an optical isolator having excellent performance and a structure suitable for mass production.

As many apparently widely different embodiments of this invention may be made without departing from the spirit and scope thereof, it is to be understood that the invention is not limited to the specific embodiments thereof except as defined in the appended claims.

What is claimed is:

1. A polarization independent optical isolator comprising at least first, second and third birefringent crystals having flat plate shapes and arranged in order in a predetermined direction, means for directing light having ordinary and extraordinary components in said direction to said first birefringent crystal, and a first magneto-optical member, the ratios of the thicknesses of said first, second and third birefringent crystals being 1:1:1, a pair of said birefringent crystals being adjacent to one another, said first magneto-optical member being interposed between the crystals of said pair of crystals so as to cause the light beam passing through one of the adjacent birefringent crystals to be changed in polarization by application of a magnetic field.

2. The polarization independent optical isolator according to claim 1, wherein said first magneto-optical member is interposed between said first and second birefringent crystals, and further comprising a second magneto-optical member interposed between said second and third birefringent crystals.

3. The polarization independent optical isolator according to claim 1, wherein said first magneto-optical member is interposed between said first and second birefringent crystals.

* * * * *